Jan. 27, 1931.  H. C. DU BOIS  1,790,464
CHAIN SWAGING AND FEEDING DEVICE
Filed Aug. 26, 1926  2 Sheets-Sheet 2

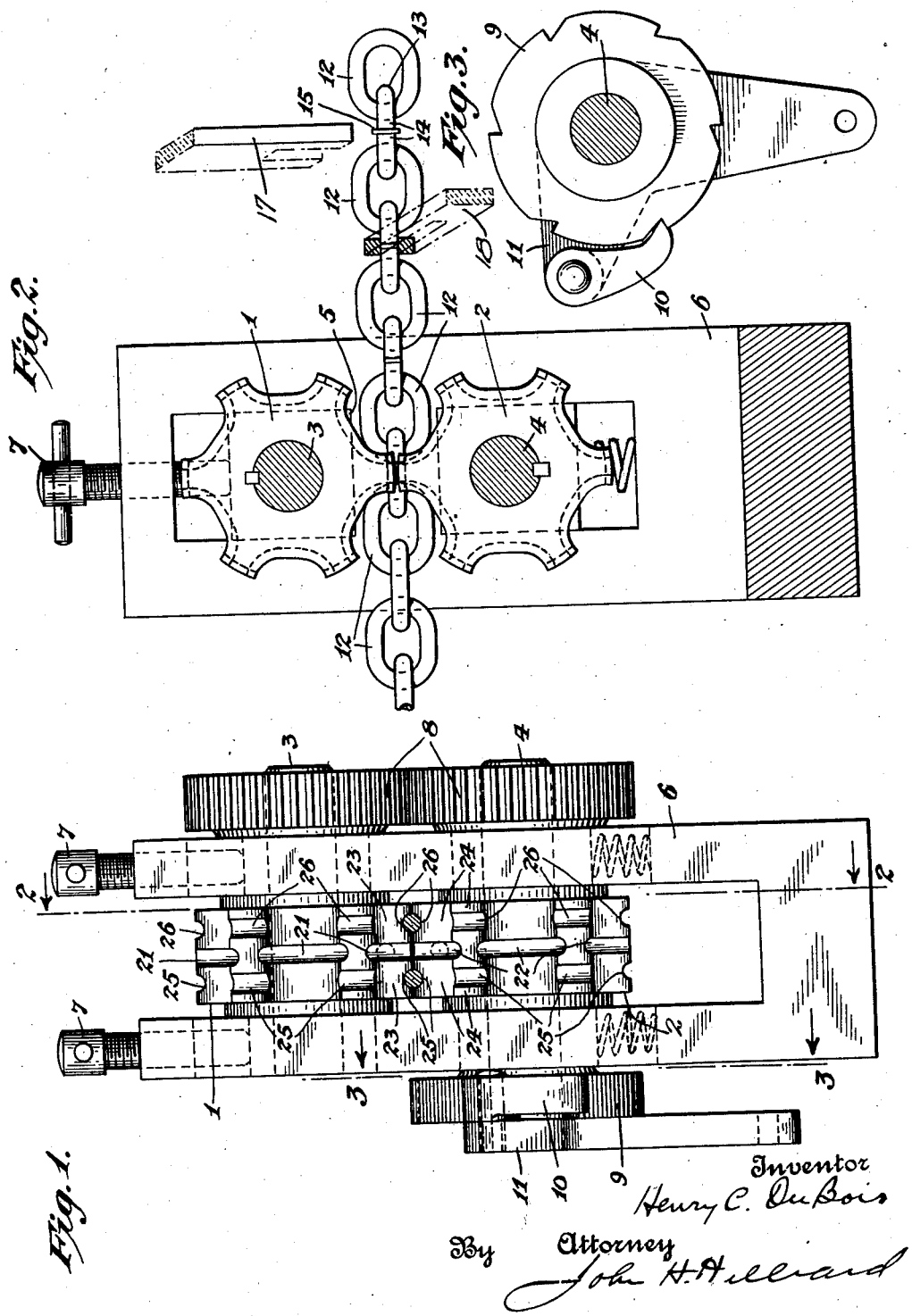

Henry C. Du Bois Inventor

By John H. Hilliard Attorney

Patented Jan. 27, 1931

1,790,464

UNITED STATES PATENT OFFICE

HENRY C. DU BOIS, OF STRATFORD, CONNECTICUT, ASSIGNOR TO AMERICAN CHAIN COMPANY, INC., A CORPORATION OF NEW YORK

CHAIN SWAGING AND FEEDING DEVICE

Application filed August 26, 1926. Serial No. 131,557.

This invention relates to the manufacture of chains, and is of particular utility when employed in connection with a process of chain-making which includes a welding operation, although it may be used to advantage in chain feed and swedging operations of a more general character.

An important object of the invention is to provide an improved process of making chains having links in which strands of certain of the links are welded as one step of the process, the improved process comprising the step of trimming the welded region to remove the extravasated semi-burnt metal and excess of metal and reduce the surplus metal or "flash" to small square corners, and the further step of swedging these corners to give the strand the desired round contour.

In previous practice, it has been customary to force the welded joint by two semi-circular dies which had the undesirable effect of forcing semi-burnt metal back into the weld and left a flash of metal projecting radially outward from opposite sides, the tongues or flash thus left being later sheared off. The forging dies used in the present practice require frequent renewals, due to the fact that they heat up excessively owing to their small size.

Another object of the invention is to provide apparatus for carrying into effect the improved process, and particularly to provide a set or couple of pocket wheels co-operating rotatively upon a chain to swedge the links successively, and at the same time to feed the chain, this set being susceptible of organization as an integral part of a welding machine, or of use in other chain feed and swedging operations.

This couple of co-operating rolls obviates the difficulty above referred to in connection with forging dies, for the reason that the rolls are large in mass and do not heat up readily, and for the further reason that the rolls are provided with several pairs of trimming dies, so that each pair of dies only operates on, say, every sixth link, and accordingly has time between trimming operations to cool down to a degree where rapid wear and deterioration does not occur.

These and other features of the invention are illustrated and described fully in the accompanying drawings and specification and are pointed out in the claims.

In the drawings:

Figure 1 is a view in front elevation of a portion of a chain-welding machine adapted to carry the improved process into effect, and which embodies the structural features of the invention.

Fig. 2 is a side elevation thereof.

Fig. 3 is a fragmentary, detail view in elevation of a portion of the feeding mechanism.

Figure 4:
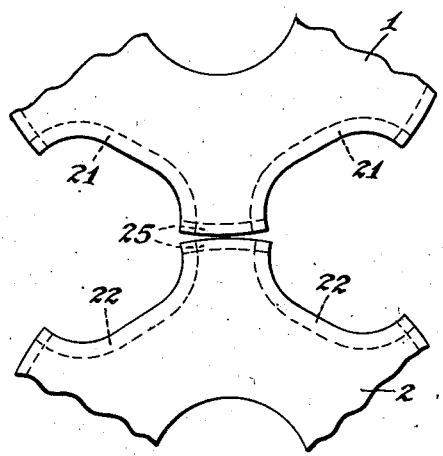
Fig. 4 is a fragmentary detail view on an enlarged scale of co-operating portions of the feeding and swedging rolls.
Figure 5:
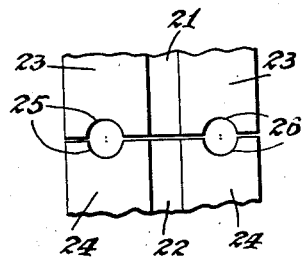
Fig. 5 is a diagrammatic view in in elevation looking into the bite of the rolls.
Figure 6:
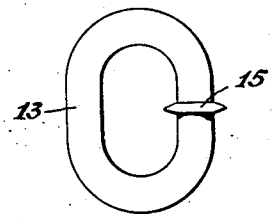
Figs. 6, 7 and 8 are plan views respectively showing a chain link at different stages of its treatment.
Figure 7:
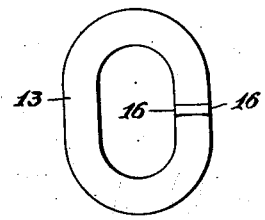
Figure 8:
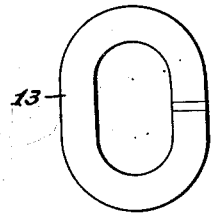
Figure 6A:
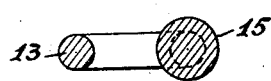
Figure 7A:
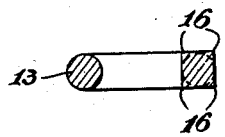
Figure 8A:

Figs. 6a, 7a and 8a being sections thereof respectively.

In the illustrated embodiment, the part designated by the reference numerals 1 and 2 are rolls or wheels journalled at 3 and 4 respectively in blocks 5 mounted in a frame 6 provided with adjusting screws 7, this structure being adapted for organization as part of a welding machine of any suitable construction, not shown, or for use in other suitable swedging machines, or independently, being furnished preferably with meshing gear-wheels 8, and with means to permit a step-by-step feeding movement, as for example the ratchet wheel 9 and pawl 10 carried by a bell-crank lever 11 mounted on the roll shaft 4 and operated by any suitable source of power not shown.

A chain is shown under treatment, and which comprises links 12 and 13 of which those designated 13 have each a strand the ends 14 of which have been butt-welded as indicated at 15 by suitable welding devices which do not form part of the present invention and are not illustrated. Figs. 6 and 6a illustrate one of these links on a larger scale, showing the condition of the welded joint 15 which is to be treated in accordance with the improved process forming the subject of this invention.

The extravasated metal, usually semi-burnt, extends radially in all directions from the strand, substantially as shown, and in pursuance of the invention, the first step in the improved method of treatment comprises the trimming of the joint, to remove this semi-burnt metal, and in general any undesirable excess of metal, reducing the joint to a form which is preferably approximately that shown in Figs. 7 and 7a, the cross-section being a square whose sides are roughly tangent to the circle of the strands periphery, leaving only small corner protuberances 16. This step may be effected by any suitable means, and as a convenient means for this purpose there are shown trimming forks 17 and 18, operating at right angles to each other, as indicated in Fig. 2, these trimming forks being actuated in well-known manner by suitable connections with the general driving mechanism of the machine, which is not illustrated, as such devices and their operation are well-known to those skilled in the art.

In pursuance of the invention, the chain is led to the wheels 1 and 2 and is fed therethrough by the action of the wheels themselves, actuated by the pawl 10 and ratchet 9, and the wheels swedge the joints to round the joint into the circular cross-section shown in Figs. 8 and 8a, corresponding to the general cross-section of the strands of the links, this operation constituting the next step of the improved process, from which the chain is delivered in the final form shown at the left-hand side of Fig. 2.

For the above purpose, the wheels 1 and 2 have in their peripheries a series of pockets 21 and 22 suitably formed to receive the vertical links 12 of the chain, which is fed thereby into and through the bite of the wheels, and the latter also have the projections 23 and 24, which intervene between the pockets, formed with suitably grooved surfaces 25 and 26, to receive the horizontal links 13 as they are fed through, the surfaces 25 constituting dies which swedge the joints 16 from the shape shown in Figs. 7 and 7a to the shape shown in Figs. 8 and 8a.

Accordingly, the rotation of the pocket wheels not only feeds the chain but also reduces the expanded portion resulting from welding down towards the original size of the bar. The swedging is done entirely by the grooves 25, and the grooves that engage the vertical links have no connection with the swedging operation in the instance illustrated.

Considering solely the grooves 25 which engage the joints of the horizontal links, as the grooves first contact with the expanded portion, the opening afforded by the grooves is substantially larger and this opening, as the swell lines up with the centre line of the rolls, reduces to the desired area. The size of this opening changes in one dimension only, the dimension parallel to the axes of the rolls remaining fixed. In other words, the opening changes in size and shape from an ellipse to a circle.

In the drawings, a joint is shown in the swedging portion of the wheels, and in practice the chain does not stop in this position leaving a hot weld stationary in the swedging wheels, but moves on a fractional part of a revolution and stops with the swedged joint entirely out of contact with the wheels, during the interval in which the welding operation is being performed by the welding jaws (not shown) on links to be thereafter swedged. This provision avoids undesirable heating of the swedging wheels and allows them to radiate the heat, which passes off quickly owing to the size of the wheels, and the consequently large radiating area they present.

Having described the invention, I claim:

1. In the process of forming chains having links with welded strands, the steps which comprise consecutive operations of trimming the extravasated semi-burnt metal from the weld, leaving a slight excess of unburned metal in the region of the weld, and thereafter swedging the weld by a rotary kneading force to the desired contour in conformity with the general contour of the strand.

2. In the process of shaping chains having preformed links with welded strands, the step which comprises the simultaneous application of a feeding force and a rotary kneading and forging pressure on the weld formed in the strands of the chain.

3. In the process of shaping chains having preformed links with welded strands, the step which comprises the simultaneous application of a feeding force and a rotary kneading and forging pressure on the weld formed in the strands of the chain in the intervals between welding operations.

4. Apparatus for forming a welded chain, said apparatus comprising means adapted to act in consecutive operations to trim semi-burnt extravasated metal from the welded portions of said chain, and rolls to knead said trimmed portions into the desired contour.

5. Apparatus for forming a welded chain, said apparatus comprising means adapted to act in consecutive operations to trim semi-burnt extravasated metal from the welded portions of said chain, and rolls to knead said trimmed portions into the desired contour corresponding to the general contour of adjacent portions of each link so treated, said kneading means operating rotatively upon said links.

6. Apparatus for finishing certain links of a chain having link strands of generally rounded cross-section with welded portions including flashes of extravasated metal extending radially from the axis of the strand, said apparatus comprising trimming forks to remove undesirable portions of said flashes, reducing said flashes to a series of relatively small radial protuberances, and swedging wheels to knead said protuberances into conformity with the rounded contour of adjacent portions of the strands.

In testimony whereof, I have signed this specification.

HENRY C. DU BOIS.